(12) United States Patent
Dwersteg

(10) Patent No.: US 12,119,776 B2
(45) Date of Patent: Oct. 15, 2024

(54) METHOD AND CIRCUIT ARRANGEMENT FOR CONTROLLING A STEPPER MOTOR

(71) Applicant: Maxim Integrated Products, Inc., San Jose, CA (US)

(72) Inventor: Bernhard Dwersteg, Rellingen (DE)

(73) Assignee: Maxim Integrated Products, Inc., San Jose, CA (US)

(*) Notice: Subject to any disclaimer, the term of this patent is extended or adjusted under 35 U.S.C. 154(b) by 393 days.

(21) Appl. No.: 17/154,101

(22) Filed: Jan. 21, 2021

(65) Prior Publication Data
US 2021/0226566 A1 Jul. 22, 2021

(30) Foreign Application Priority Data
Jan. 21, 2020 (DE) .......................... 102020101376.0

(51) Int. Cl.
| | |
|---|---|
| *H02P 7/29* | (2016.01) |
| *H02M 3/337* | (2006.01) |
| *H02P 6/17* | (2016.01) |
| *H02P 8/12* | (2006.01) |
| *H02P 23/04* | (2006.01) |

(52) U.S. Cl.
CPC ............ *H02P 8/12* (2013.01); *H02M 3/3376* (2013.01)

(58) Field of Classification Search
CPC .................................. H02P 27/08; H02P 6/18
See application file for complete search history.

(56) References Cited

U.S. PATENT DOCUMENTS

| | | | |
|---|---|---|---|
| 2009/0045764 A1 | 2/2009 | Hoogzaad | |
| 2010/0321041 A1* | 12/2010 | Feldtkeller | H02M 1/38 |
| | | | 324/680 |
| 2017/0063221 A1* | 3/2017 | Tsai | H02K 11/40 |
| 2019/0207514 A1* | 7/2019 | Yu | H02M 3/07 |

FOREIGN PATENT DOCUMENTS

DE     102010046964 A1     3/2012

OTHER PUBLICATIONS

German Search Report from the German Patent and Trademark Office dated Jan. 11, 2021, (10 pgs).

* cited by examiner

*Primary Examiner* — Kawing Chan
*Assistant Examiner* — Charles S Laughlin
(74) *Attorney, Agent, or Firm* — North Weber & Baugh; Michael North

(57) ABSTRACT

Described is a method and a circuit arrangement for controlling a stepper motor in a voltage-controlled or voltage-regulated operating mode, having a bridge circuit provided for a motor coil (A) with semiconductor switches (HS1, HS2, LS1, LS2) for applying a first and a second PWM voltage (U(LA1), U(LA2)) having opposite polarity to the motor coil (A) and having a charge pump for switching at least the high-side semiconductor switch (HS1, HS2) of the bridge circuit. Because the charge pump must wait for a blocking or dead time before a further semiconductor switch can be switched after switching a first semiconductor switch, the time interval between a rising edge of one of the two PWM voltages and a subsequent rising edge of the respective other PWM voltage is increased at least until the blocking or dead time of the charge pump has elapsed.

8 Claims, 4 Drawing Sheets

METHOD AND CIRCUIT ARRANGEMENT FOR CONTROLLING A STEPPER MOTOR

CROSS REFERENCE TO RELATED APPLICATION

The application claims priority to German Patent Application No. 102020101376.0, entitled "METHOD AND CIRCUIT ARRANGEMENT FOR CONTROLLING A STEPPER MOTOR", filed on Jan. 21, 2020, and listing Bernhard Dwersteg as the inventor. The aforementioned patent document is incorporated by reference herein in its entirety.

BACKGROUND

A. Technical Field

The invention relates to a method and a circuit arrangement for controlling a stepper motor in a voltage-controlled or voltage-regulated operating mode, having a bridge circuit provided for a motor coil with semiconductor switches for applying a first and a second PWM voltage having opposite polarity to the motor coil and having a charge pump for switching at least the high-side semiconductor switch of the bridge circuit.

B. Background of the Invention

In a voltage-controlled or voltage-regulated operating mode, a nominal coil current is not impressed into the motor coils via the activation and duration of current flow phases, but rather is generated by means of a voltage applied to the motor coils and is set by changing the magnitude thereof (or the amplitude thereof) and the direction thereof (or polarity).

Said voltage is typically a PWM voltage obtained from the motor supply voltage by means of a bridge circuit and applied to the motor coils with the appropriate polarity, wherein the duty cycle of this PWM voltage is controlled or regulated in each case so that the effective PWM voltage on each of the motor coils has a magnitude which allows the instantaneous nominal coil current to flow.

Particularly, according to WO 2015/192831A1, for example, a first PWM voltage having a first polarity and a second PWM voltage having a second polarity opposite thereto are applied to the motor coils, so that by changing the pulse widths of these two voltages relative to one another, an effective PWM voltage in the form of a differential voltage having positive or negative polarity is applied to the relevant motor coil, the effective duty cycle of which can be set between −100% (negative polarity) and +100% (positive polarity).

To implement this control in terms of circuit technology, it is known to provide a bridge circuit consisting of a first to fourth semiconductor switch, particularly MOSFET switch, for each motor coil, the bridge circuit lying between a supply voltage source and earth, wherein the motor coil is connected to the midpoints of the bridge arms. The semiconductor switches are switched by means of a PWM driver circuit so that the effective PWM voltage explained above is applied to the coil.

Particularly in the case of MOSFET switches and an N&N channel bridge, there is the difficulty in that the two upper switches (high-side MOSFETs), that is, lying between the supply voltage source and the midpoints of the bridge arms, require a control voltage which is greater than the supply voltage by at least the threshold voltage in order to be able to switch through efficiently.

The background to this is the fact that switching on the MOSFET switches requires a certain amount of energy (current*time) to charge the MOSFET gate from 0 V to the nominal voltage at which the MOSFET has its optimum operating point. The energy results from the respective gate charge of the MOSFET, which is specified in nano-coloumb. The process is very fast in relation to the frequency of the PWM voltage, typically in the range of less than 1 microsecond. The actual switching process only takes a fraction of this time, during which the MOSFET's Miller plateau is over-come. The subsequent further charging of the gate to the optimum voltage has a little more time, since the switching process is largely complete, but the internal resistance of the MOSFET still decreases in the sense of lower ohmic power loss. The MOSFETs, on the other hand, can be blocked or discharged by bridging the gate and source terminal so that the charge can flow away or is converted into heat. Particularly, charging the high-side MOSFET requires a charge pump or a bootstrap circuit so that the final voltage (typically 5 V to 12 V) above the supply voltage can be achieved.

Using a bootstrap circuit with a capacitor for each MOSFET switch or a charge pump with a charge storage device common to all MOSFET switches is known, wherein at least two capacitors are required. Since a relatively high power is required to switch the MOSFET switches, especially when a plurality of MOSFET switches has to be switched on substantially simultaneously in order, as explained above, to apply two PWM voltages having opposite polarity to a coil, the capacitors must have a relatively have large capacitance and thus have a correspondingly large space requirement on the circuit board. Particularly in the case of a fully integrated charge pump, the space requirement for the capacitors is very high in comparison to the other components of the charge pump due to the process and the greater the number of MOSFETs to be switched simultaneously.

When a charge pump having external capacitors is used, additional terminal pins are required and additional costs arise for the user.

It would also be conceivable to dispense with a charge pump by using a mixed N&P channel bridge. However, this has the disadvantage that, compared to an N&N channel bridge, about 50% more area is required in principle, since the P-channel MOSFET switches on a P-substrate have about twice as high an on-resistance per unit area.

SUMMARY OF THE INVENTION

The object of the invention is therefore to create a method and a circuit arrangement for controlling a stepper motor in a voltage-controlled or voltage-regulated operating mode, in which the space requirement for a charge pump can be substantially reduced.

This object is achieved using a method according to claim 1 and a circuit arrangement according to claim 6.

A principle of the invention consists in preventing two MOSFET switches of the bridge circuit from being switched on substantially simultaneously and thereby limiting the maximum current to be applied by the charge pump, so that particularly the charging and pump capacitors are designed correspondingly smaller in terms of the capacitance thereof and can thus be implemented as integrated components.

For this purpose, in the case where the rising edges of the first and the second PWM voltage fall below a certain minimum time interval, one of the rising edges or the rising edge that occurs later is delayed in time. To compensate for the resulting change in the duty cycle of the effective PWM voltage (differential voltage), the falling edge of the same PWM voltage is also delayed by the same period of time.

Said minimum time interval is selected to be at least as large as the period of time that must be waited before a next switching process can be started after switching one of the semiconductor switches. Said period of time is substantially determined by the charging time of the capacitors of the charge pump and is referred to as the "blocking or dead time".

A particular advantage of this solution is that it can substantially reduce the space required by the charge pump and thus the entire (integrated) motor driver circuit, which in turn leads to a considerable reduction in manufacturing costs.

The dependent claims contain advantageous developments of the invention.

The time delays of the edges preferably take place within the same chopper cycle. It is advantageous when the chopper switching signals and thus the pulses of the PWM voltages U(LA1), U(LA2) are generated centred in time within each chopper cycle.

BRIEF DESCRIPTION OF THE DRAWINGS

Further details, features and advantages of the invention emerge from the following description of preferred embodiments with reference to the drawing. Shown are.

DETAILED DESCRIPTION OF THE PREFERRED EMBODIMENTS

Figure 1:
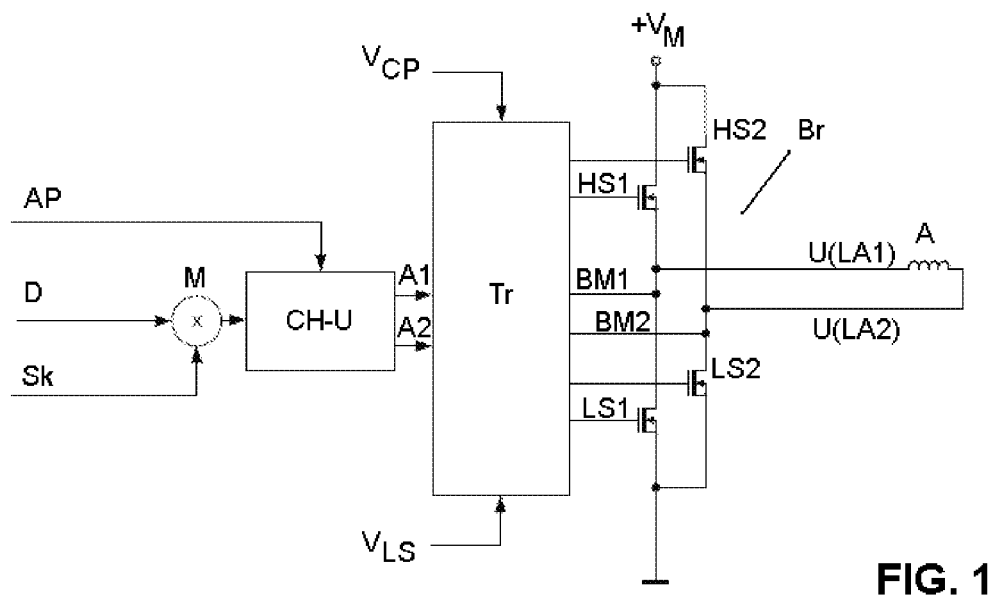
FIG. 1 a functional circuit diagram of a circuit for controlling a coil of a stepper motor in a voltage-controlled operating mode.

FIG. 1 shows a simplified functional circuit diagram of essential parts of a circuit arrangement for controlling a coil A of a stepper motor in a voltage-controlled operating mode, as is known from WO 2015/192831A1.

The circuit arrangement comprises, as components known per se, a voltage chopper CH-U, a multiplier M, an integrated motor driver circuit Tr, and a bridge circuit Br lying between a supply voltage +VM and earth, the bridge circuit being formed by a first and a second high-side MOSFET switch HS1, HS2 and a first and a second low-side MOSFET switch LS1, LS2. A motor coil A is connected to the midpoints BM1, BM2 of the bridge arms.

A predetermined nominal coil current D for the motor coil A is applied at a first input of the multiplier M, the coil current being typically supplied by a sequencer with a sine/cosine table.

A signal Sk generated in a known manner for scaling the nominal coil current D applied at the first input of the multiplier M is supplied to a second input of the multiplier M. The output of the multiplier M, at which the scaled current specification Sk*D is applied, is connected to a first input of the chopper CH-U.

A signal AP supplied to the circuit arrangement for setting the operating parameters of the chopper CH-U is applied at a second input of the voltage chopper CH-U.

The voltage chopper CH-U generates a first PWM voltage U(LA1) according to FIG. 5(A) and a second PWM voltage U(LA2) according to FIG. 5(B) at the two outputs A1, A2 thereof connected to the driver circuit Tr, as a function of the signals applied at the inputs thereof, which is discussed later.

Further, the driver circuit Tr is supplied with a first control voltage VCP generated by a charge pump for switching the high-side MOSFET switches HS1, HS2, and preferably a second control voltage VLS for switching the low-side MOSFET switches LS1, LS2.

The driver circuit Tr comprises outputs which are connected to the control terminals of the first and second high-side MOSFET switches HS1, HS2, the control terminals of the first and second low-side MOSFET switches LS1, LS2 and the two bridge midpoints BM1, BM2.

The switches of the bridge circuit Br are controlled using the driver circuit Tr so that in the voltage-controlled or voltage-regulated operating mode, the first PWM voltage U(LA1) (FIG. 5(A)) in a first direction (polarity) and the second PWM voltage U(LA2) (FIG. 5(B)) in the opposite second direction (polarity) are applied to the coil A of the stepper motor, so that an effective PWM voltage U(LA1-LA2) according to FIG. 5(C) is created across the coil A.

Figure 2:
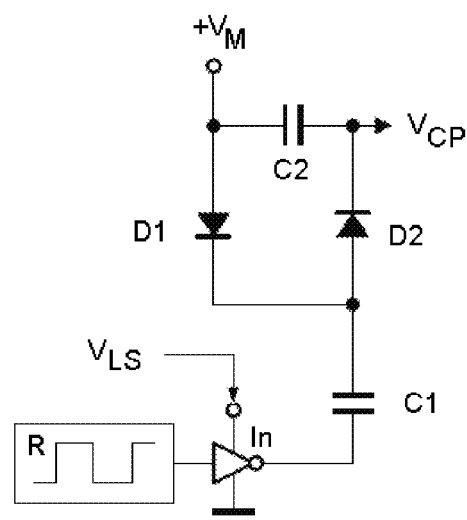
FIG. 2 a functional circuit diagram of a charge pump.

As already mentioned at the outset, the two high-side MOSFET switches HS1, HS2 each particularly require a control voltage which is above the supply voltage +VM for efficient switching. Such a control voltage VCP for one of the two high-side MOSFET switches can be generated using a known charge pump, represented schematically in FIG. 2, which comprises a square wave generator R, an inverter In, two anti-parallel connected diodes D1, D2 and two capacitors C1, C2, and with which the charge pump voltage VCP=VM+VLS (minus the diode forward voltage and the losses in drivers and voltage drops) for the control terminals of the high-side MOSFET switch can be generated.

Such a charge pump is particularly suitable for integration into an IC, since the switching frequency can be selected so high that the surface-intensive capacitors, which are responsible for a large part of the area of the charge pump, can be selected to be small.

The switching frequency of the charge pump cannot, however, be selected to be arbitrarily high. A few 100 kHz are typical for charge pumps with external capacitors, since the capacitors can be chosen to be sufficiently large. This compromise makes it possible not to let the switching edges become too steep and thus to pre-vent EMC problems due to emissions at the switching pins. A frequency in the range from a few MHz to several 10 MHz can be selected with an integrated charge pump, since this frequency is not visible to the outside. However, beyond a few 10 MHz, depending on the process, a significant decrease in efficiency is to be expected, since the switches of the charge pump themselves and the control thereof would generate relevant losses, especially since said MOSFETs also have a gate capacitance that has to be recharged at the corresponding frequency. The same applies to the rectifier diodes, which also have a time response. A compromise thus has to be chosen here between capacitance and frequency of the charge pump.

The overall size of an on-chip charge pump is thus substantially determined by the capacitor capacitance, which must be kept available to charge the gate of a high-side MOSFET (opposite the source terminal) from 0V at least to the end of the Miller plateau and beyond, and by the charging current with which the MOSFET is then charged to the final voltage within a short time, that is, within a few pump cycles of the charge pump, and the capacitors are recharged. The charge pump must there-fore apply the entire gate charge once per chopper cycle for each switching high-side MOSFET in order to reach the final voltage from 0 V. The chopper cycles typically have a frequency of approximately 20 kHz to approximately 40 kHz, that is, a chopper cycle has a period of time of a few 10 µs. In a typical component, for example, a motor driver for three or four motor coils, the charge pump thus only works for a few microseconds under high load within each chopper cycle per half bridge, that is, with a duty cycle of well below 20%.

Figure 3:
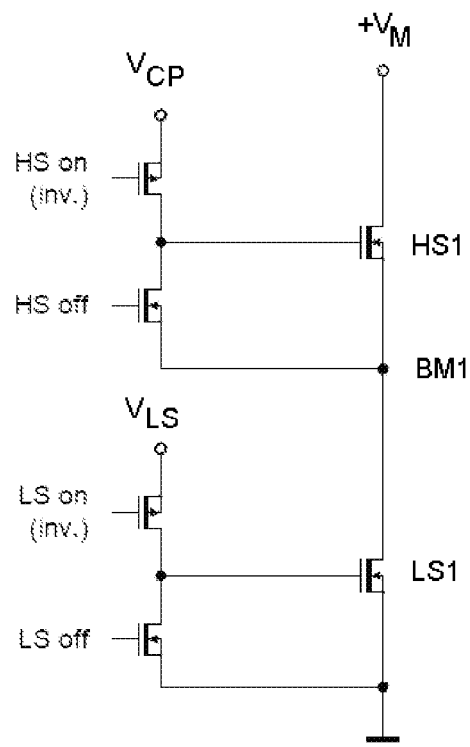
FIG. 3 a functional circuit diagram of a control of an N-channel half-bridge with a charge pump.

Thus, each of the two half bridges of the bridge circuit Br is controlled according to the circuit shown in FIG. 3 for one of the half bridges (N-channel output stage), which is preferably part of the driver circuit Tr according to FIG. 1. To switch on the high-side MOSFET HS1, the charge pump voltage VCP is applied to the gate terminal thereof by closing an HS-on switch. To switch on the low-side MOSFET LS1, the voltage VLS is applied to the gate terminal thereof by closing an LS-on switch. To switch off the high-side MOSFET HS1, an HS-off switch is closed, while an LS-off switch is closed to switch off the low-side MOSFET LS1.

Figure 4:
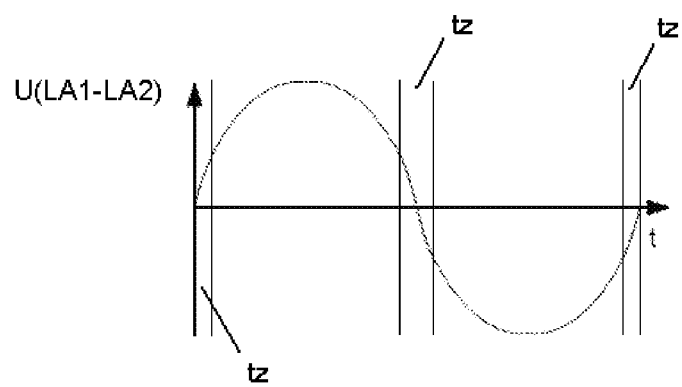
FIG. 4 a profile of a predetermined nominal coil current.

FIG. 4 shows a typical profile of a period of an effective PWM voltage U(LA1-LA2) applied to a coil of a motor in the voltage-controlled or voltage-regulated operating mode for generating a predetermined, typically sinusoidal nominal coil current Icoil. Since this effective PWM voltage results from the superposition of a first and a second PWM voltage U(LA1) and U(LA2) having opposite polarity, in the region tz surrounding the zero crossings of the effective PWM voltage, the duty cycles of the two individual PWM voltages are each about 50%, so that the switching times of the relevant semiconductor switches are close to one another.

Figure 5:
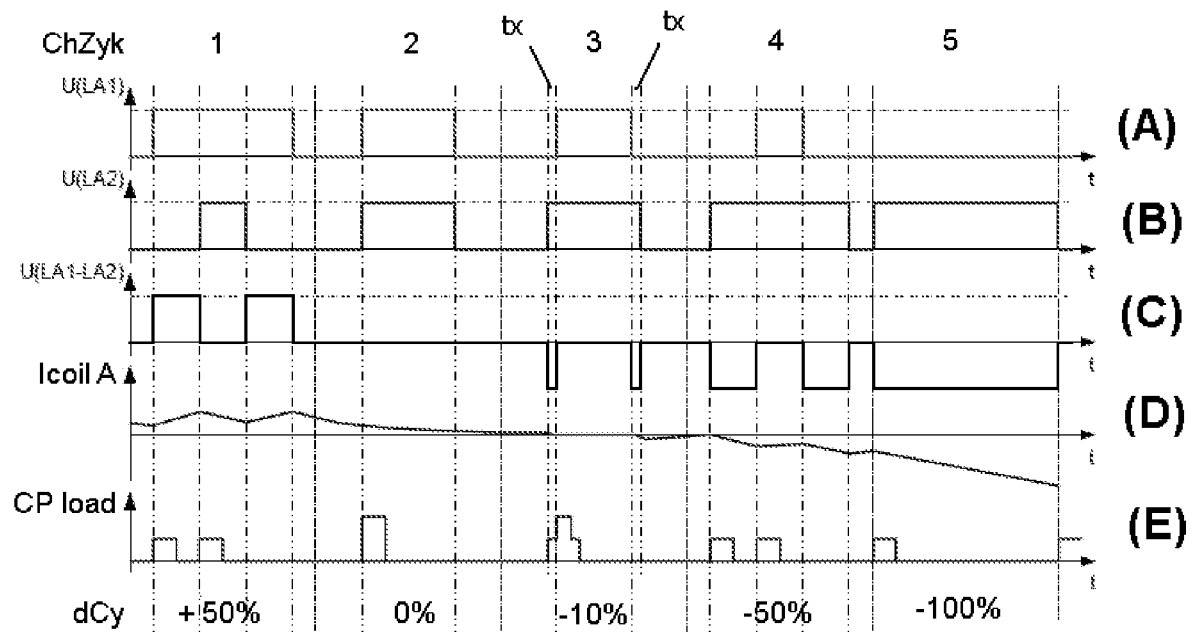
FIG. 5 time profiles of a known PWM control of a motor coil.

This is clear from FIG. 5. The time profile of the first and second PWM voltage U(LA1), U(LA2) is shown in FIGS. 5(A) and (B), respectively, for five chopper cycles ChZyk 1, 2, 3, . . . 5, each of which voltage is applied to the motor coils A, each having opposite polarities. Thus, by changing the pulse widths of these two voltages relative to one another, an effective PWM voltage in the form of a differential voltage U(LA1-LA2) (FIG. 5(C)) having positive or negative polarity is applied to the relevant motor coil, the effective duty cycle dCy of which can be set between −100% (negative polarity) and +100% (positive polarity). The actual coil current profile Icoil resulting therefrom is indicated by way of example in FIG. 5(D) in the region of the zero crossing and is thus generated by a plurality n of such chopper cycles 1, 2, . . . n.

FIG. 5(E) shows the time profile of the resulting power CP-load to be generated by the charge pump. It can be clearly seen that, particularly in chopper cycles 2 and 3, in which rising switching edges of the two PWM voltages U(LA1), U(LA2) are close together, this power is at times twice as high as in the other chopper cycles.

Figure 6:
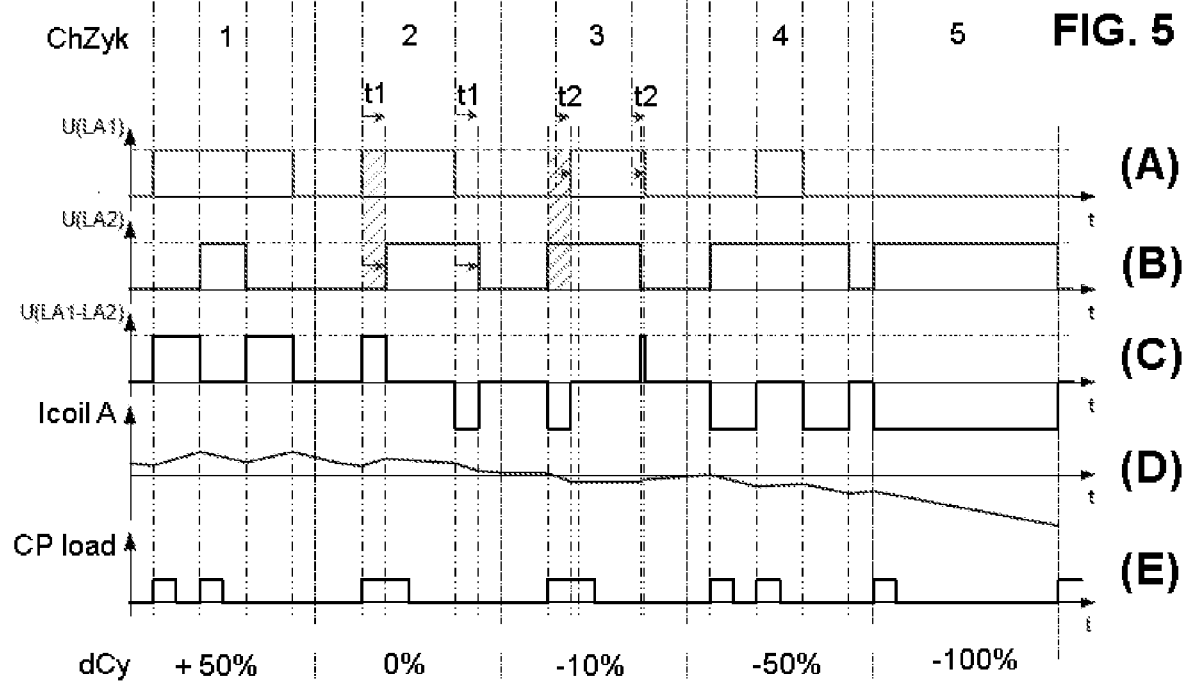
FIG. 6 time profiles of a PWM control of a motor coil according to the invention.

In order to minimize the size of the charge pump, the maximum current for which the charge pump is to be designed is minimized. According to the invention, without disrupting the chopper switching signals, which are preferably centre-symmetrical in each chopper cycle (and thus also the equally centre-symmetrical individual voltage pulses of the PWM voltages U(LA1), U(LA2)), a plurality of or more than a certain number of MOSFET switches must be switched simultaneously by means of the charge pump, in that one of the voltage pulses of the PWM voltages U(LA1), U(LA2) is shifted in time within a chopper cycle with respect to the other. This is shown in FIG. 6.

If the rising edges of the two voltage pulses of the PWM voltages U(LA1), U(LA2) occur simultaneously within a chopper cycle or fall below a minimum time interval from one another, one of the two or the rising edge that occurs later, that is, switching on the relevant MOSFET switch, is delayed. However, since this would change the effective PWM voltage U(LA1-LA2), which represents the difference between the two opposite-pole PWM voltages U(LA1), U(LA2) applied to the coil, within the same chopper cycle, the falling edge of the voltage pulse of the same PWM voltage following the rising edge, that is, the subsequent switching off of the same MOSFET switch, is delayed by the same time as it is switched on. As a result, the effective duty cycle dCy does not change within the respective chopper cycle, and the effective PWM voltage (differential voltage) within said chopper cycle re-mains constant, since, for example, a positive PWM voltage value on the coil occurring due to said shift in the differential voltage is compensated for by a negative PWM voltage value of the same length (see FIG. 6(C), chopper cycle 2). The inductance of the coil averages between said voltage pulses, so that effectively the same current flows through the coil.

Said minimum time interval between the rising edges is preferably chosen to be at least as long as the period of time required to complete the switch-on process of a MOSFET switch and the charging process of the capacitors of the charge pump (so-called "blocking time" or "dead time"). When a next switch-on process of another MOSFET switch only begins after said blocking time has elapsed, as depicted in chopper cycles 1 and 4 in FIGS. 5 and 6, the rising edge that occurs later does not need to be delayed. In other words, a delay in a rising edge is only necessary when the two PWM voltages have rising edges within a chopper cycle, the time interval between which is less than or equal to said blocking time of the charge pump.

The processes will first be explained in detail with reference to FIG. 6 for the chopper cycle ChZyk.

FIG. 6(A) shows the PWM voltage pulse of the first PWM voltage U(LA1), unchanged with respect to FIG. 5(A). Since, according to FIG. 5(B) in chopper cycle 2, the second PWM voltage U(LA2) has a rising edge at the same time as the first PWM voltage U(LA1), said rising edge is delayed by a first delay time t1 according to FIG. 6(B). Correspondingly, the falling edge of said PWM voltage is also delayed by the same first delay time t1, so that now the effective PWM voltage U(LA1-LA2) according to FIG. 6(C) in said chopper cycle in contrast to FIG. 5(C) has a positive and a negative voltage value, but these compensate each other at the coil and the duty cycle dCy of the effective PWM voltage U(LA1-LA2) remains the same (namely at 0%) and as a result, the generated coil current Icoil (FIG. 6(D)) does not change at least substantially. It is clear from FIG. 6(E) that, however, compared to FIG. 5(E), the peak power of the charge pump has roughly halved and instead the reduced power has to be applied for about twice as long.

In chopper cycle 3, the case is depicted according to FIGS. 5(A) and 5(B), in which the second PWM voltage U(LA2) initially has a rising edge and the rising edge of the first PWM voltage U(LA1) occurs later by a time interval tx, the duration of which is less than said blocking time or the selected minimum time interval. Due to the PWM voltage pulses each preferably time-centred within the chopper cycles 1, 2, 3, . . . , the falling edge of the first PWM voltage U(LA1) also occurs earlier by the same time interval tx than the falling edge of the second PWM voltage U(LA2), so that the effective PWM voltage U(LA1-LA2) shown in FIG. 5(C) results with two short voltage values of the same polarity across the coil. The resulting time profile of the required power or current output of the charge pump is depicted in FIG. 5(E).

Since the second PWM voltage U(LA2) is already in the switching process due to the rising edge in chopper cycle 3, the rising edge of the first PWM voltage U(LA1) is delayed by a second delay time t2. Consequently, the falling edge of said PWM voltage is then also delayed by the same delay time t2, so that now the effective PWM voltage U(LA1-LA2) in this chopper cycle 3 according to FIG. 6(C) has a longer negative voltage value and additionally a short positive voltage value.

Thus, the duty cycle dCy of the effective PWM voltage U(LA1-LA2) remains the same in this chopper cycle (namely at −10%), and the coil current Icoil (FIG. 6(D)) generated thereby remains at least substantially unchanged. It is clear from FIG. 6(E) that, in comparison to FIG. 5(E), the power peak of the charge pump has halved and instead the reduced power must be applied correspondingly longer.

When dimensioning the delay times t1, t2, it must be taken into account that after the occurrence of a rising edge (that is, the switching on of the relevant MOSFET switch), it is necessary to wait for said blocking time that the charge pump needs to charge the MOSFET gate to the final voltage and recharge the buffer capacitor before the other MOSFET switch can be switched on. In the case depicted for chopper cycle 2 of the simultaneous occurrence of two rising edges, the (first) delay time t1 must therefore be at least as long as this blocking time. When, on the other hand, according to the case shown in chopper cycle 3, the rising edge of the first PWM voltage U(LA1) does not occur until a time interval tx later than the rising edge of the second PWM voltage U(LA2), the (second) delay time t2 for the rising edge of the first PWM voltage U(LA1) only needs to be long enough until said blocking time of the charge pump, which began with the switching process of the second PWM voltage U(LA2), has elapsed.

The first delay time t1 is preferably determined beforehand, for example, to be equal to the blocking time or somewhat greater than the blocking time and then remains constant. The second delay time t2 currently possibly required in a chopper cycle can then be determined separately from the first delay time t1 by subtracting the current duration of said time interval tx.

It is possible to also use this method for switching the low-side MOSFET switches, even if the problem explained at the outset (control voltage above the supply voltage and the thus associated space requirement for charging and pump capacitors with substantially simultaneous switching of two high-side MOSFET switches) is not present.

Figure 7:
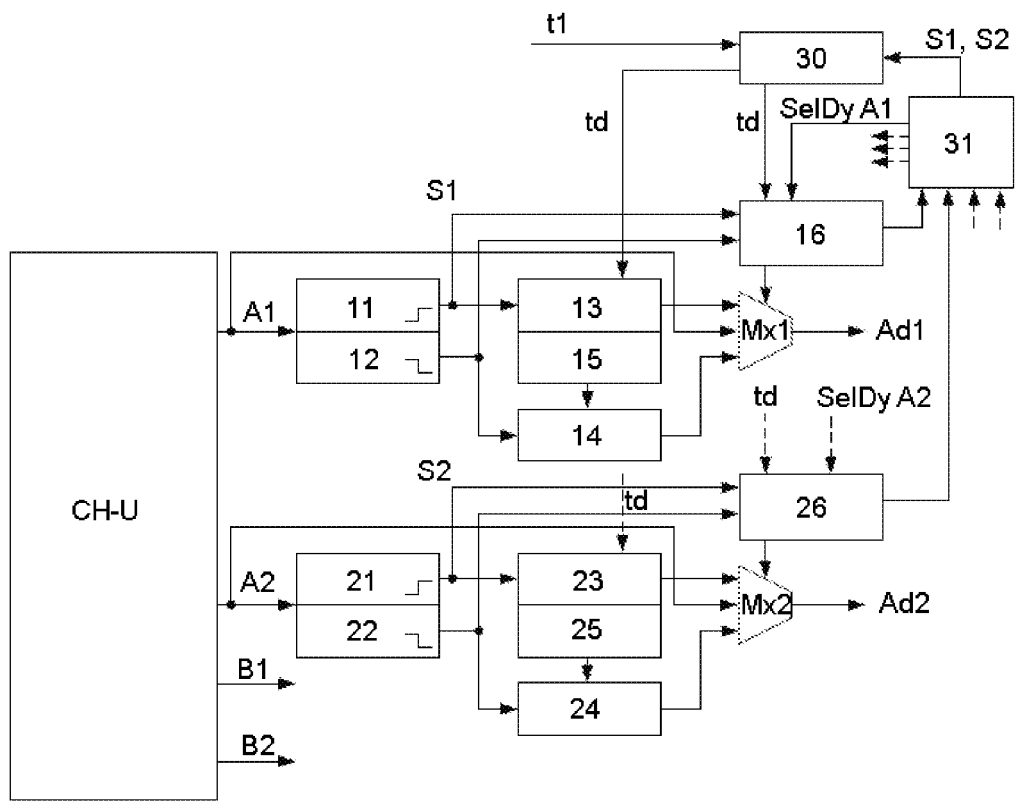
FIG. 7 a functional circuit diagram of a circuit arrangement for the PWM control according to the invention of a motor coil.

FIG. 7 shows a functional circuit diagram of a circuit arrangement according to the invention for carrying out this method.

The first and second PWM voltage U(LA1), U(LA2) generated by the voltage chopper CH-U at the first and second output A1, A2, respectively, for a first coil A of a stepper motor according to FIG. 1 is not directly supplied to the driver circuit Tr but rather processed according to the invention using the components shown in FIG. 7 and then applied to the driver circuit Tr via outputs Ad1, Ad2 according to FIG. 1.

For the first PWM voltage U(LA1), the circuit arrangement comprises a first L-H edge detector 11 for detecting the rising edge of the PWM pulses of the first PWM voltage U(LA1) and a first H-L edge detector 12 for detecting the falling edge of the PWM pulses of the first PWM voltage U(LA1), wherein the inputs of the edge detectors 11, 12 are connected to the first output A1 of the voltage chopper CH-U.

Furthermore, a first L-H delay unit 13 for delaying a rising edge and a first H-L delay unit 14 for delaying a falling edge of the PWM pulses of the first PWM voltage U(LA1) are provided, the first inputs of which are each connected to an output of the first L-H edge detector 11 and an output of the first H-L edge detector 12, respectively, and the outputs of which are applied to a first and second input of a first multiplexer Mx1, respectively. A third input of the first multiplexer Mx1 is connected to the first output A1 of the voltage chopper CH-U.

The circuit arrangement also comprises a first delay measuring unit 15 for measuring and storing the delay with which a rising edge is delayed by the first L-H delay unit 13. The output of the first measuring unit 15 is connected to a second input of the first H-L delay unit 14. In this way, the falling edge detected using the first H-L edge detector 12 is delayed by means of the first H-L delay unit 14 to the same extent as the rising edge delayed using the first L-H delay unit 13.

Furthermore, a first switching unit 16 is provided, the first and second input of which are connected to the output of the first L-H edge detector 11 and the output of the first H-L edge detector 12, respectively, and by means of which the first multiplexer Mx1 is switched so that either the undelayed first PWM voltage U(LA1) or the delayed rising and falling edge of the PWM pulse of the first PWM voltage U(LA1) output by the L-H and the H-L delay unit 13 and 14 is switched through to the output Ad1 in the relevant chopper cycle.

These first components are once again provided in the same way as second components for the second PWM voltage U(LA2) at the second output A2 of the voltage chopper CH-U.

The circuit arrangement further comprises a common time counter 30, into which the predetermined first delay time t1 is loaded (which is at least as long as the blocking or dead time of the charge pump), and which starts a countdown corresponding to the length of the first delay time t1 when a first start signal (which is triggered by a temporally first rising edge of the first or second PWM voltage) is input. This countdown is ended when a second start signal (which is triggered by a rising edge of the other PWM voltage occurring simultaneously or by the period of time tx later) is input (simultaneously or later by the period of time tx) or at the latest when the first delay time t1 has elapsed. The status of the countdown counter at the end of the countdown thus corresponds to the second delay time t2=t1−tx, by which the rising edge that occurs later must still be delayed, in order to achieve the minimum time interval from the first (undelayed) rising edge corresponding to the first delay time t1.

The second delay time t2 determined in this way is supplied in the form of a delay time signal td to a second input of the first and second L-H delay unit 13, 23 and to a third input of the first and second switching unit 16, 26.

Finally, the circuit arrangement comprises a common priority unit 31, the first and second input of which is connected to the output of the first and second switching unit 16, 26, respectively, and the first output of which is applied to a second input of the time counter 30. A second and third output of the priority unit 31 is connected to a fourth input of the first and second switching unit 16, 26, respectively.

The mode of operation of the circuit arrangement will first be described for the case where rising edges (tx=0) of the first and second PWM voltage U(LA1), U(LA2) occur simultaneously within a chopper cycle. Said case is depicted in FIGS. 5 and 6 in the chopper cycle ChZyk 2.

The detection of rising edges by the first and second L-H edge detector 11, 21 is transmitted in the form of a first and second start signal S1, S2, respectively, to the first and second switching unit 16, 26, respectively, and from said switching unit to the priority unit 31, which determines which of the rising edges is delayed and which is switched through without delay to the output of the first or second multiplexer Mx1, Mx2. This is preferably determined in advance, for example, as depict-ed in FIG. 6 in chopper cycle 2, the rising edge of a predetermined first PWM voltage U(LA1) is not delayed, while the rising edge of the other second PWM voltage U(LA2) is delayed.

Accordingly, the priority unit 31 transmits a second selection signal SeDy A2=1, which selects the rising edge of the second PWM voltage U(LA2) for delay, to the second switching unit 26, so that said second switching unit switches the second multiplexer Mx2 so that the outputs of the second L-H delay unit 23 and the second H-L delay unit 24 are applied at the output Ad2 of the second multiplexer Mx2. A first selection signal SelDy A1=0 supplied to the first switching unit 16 switches the first multiplexer Mx1 so that the undelayed first PWM voltage U(LA1) is switched through at the output Ad1 thereof during said chopper cycle.

The start signals S1, S2 generated simultaneously by the two rising edges are also transmitted by the priority unit 31 to the time counter 30, which then starts a countdown that is immediately ended again, so that the second delay time t2=t1 −0 and thus is equal to the first delay time t1.

Alternatively, it is also possible not to end the countdown started by the arrival of a first start signal S1 by the following second start signal S2, but rather to read out the counter reading corresponding to the second delay time t2 at this point in time and simultaneously let the countdown always run down to zero. This is particularly useful when, for example, in the case of a three-phase motor, more than two MOSFET switches are to be switched so that when a third start signal triggered by a rising edge arrives, the third delay time t3=t2+t1 can be determined. This also applies accordingly to the case, which is explained below, in which the first and second start signal S1, S2 are triggered one after the other, that is, tx is greater than zero.

The delay time signal td representing the second delay time t2 is applied to the second L-H delay unit 23. The delay time signal td causes the second L-H delay unit 23 to only then apply the rising edge of the second PWM voltage U(LA2) to the relevant input of the second multiplexer Mx2 and is thus switched through to the output Ad2 thereof when the second delay time t2 represented by the delay time signal td has elapsed.

As soon as a falling edge of the second PWM voltage U(LA2) is detected by the second H-L edge detector 22, said falling edge is delayed by means of the second H-L delay unit 24 by the same second delay time t2 stored in the second delay measuring unit 25 and with this delay applied to the relevant input of the second multiplexer Mx2 and switched through to the output Ad2 thereof.

The delay time signal td also applied to the second switching unit 26 finally causes, after the second delay time t2 has elapsed, the second multiplexer Mx2 to be switched again so that the (undelayed) second PWM voltage U(LA2) from the terminal A2 to the output Ad2 of the second multiplexer Mx2 is switched through. This completes the shifting of the edges of the second PWM voltage U(LA2) in this chopper cycle.

The following will explain the differences to the case in which a rising edge of the second PWM voltage U(LA2) occurs within a chopper cycle and a rising edge of the first PWM voltage U(LA1) occurs after a time interval tx, where tx<t1 and thus the (later occurring) first PWM voltage pulse is to be delayed. Said case is depicted in FIGS. 5 and 6 in the chopper cycle ChZyk 3.

In this case, the second start signal S2 is generated first and after the period of time tx has elapsed, the first start signal S1 is generated and supplied to the priority unit 31 via the second or first switching unit 26, 16.

In accordance with the first start signal S1 arriving later, the priority unit 31 applies a first selection signal SeDy A1=1, which selects the rising edge of the first PWM voltage U(LA1) for delay, to the first switching unit 16, so that said first switching unit switches the first multiplexer Mx1 so that that the outputs of the first L-H delay unit 13 and the first H-L delay unit 14 are applied at the output Ad1 of the first multiplexer Mx1. A second selection signal SelDy A2=0 supplied to the second switching unit 26 switches the second multiplexer Mx2 so that the undelayed second PWM voltage U(LA2) is switched through at the output Ad2 thereof during this chopper cycle.

The second start signal S2 is in turn supplied to the time counter 30 via the second switching unit 26 and the priority unit 31 and starts the countdown. As soon as the first start signal S1 passed via the first switching unit 16 and the priority unit 31 is applied to the time counter 30 after the period of time tx has elapsed, the count-down is stopped and the count reading in the form of the delay time signal td=t2=t1 −tx is applied to the first L-H delay unit 13. The delay time signal td in turn causes the first L-H delay unit 13 to then only apply the rising edge of the first PWM voltage U(LA1) to the relevant input of the first multiplexer Mx1 and is thus switched through to the output Ad1 thereof when the second delay time t2=t1 −tx represented by the delay time signal td has elapsed.

As soon as a falling edge of the first PWM voltage U(LA1) is detected by the first H-L detector 12, said falling edge is delayed by means of the first H-L delay unit 14 by the same second delay time t2 stored in the first delay measuring unit 15 and switched through to the output Ad1 of the first multiplexer Mx1.

The delay time signal td also applied to the first switching unit 16 finally causes, after the second delay time t2 has elapsed, the first multiplexer Mx1 to be switched again so that the first PWM voltage U(LA1) is switched through again from the terminal A1 to the output Ad1 of the first multiplexer Mx1. This ends the shifting of the edges of the first PWM voltage U(LA1) in said chopper cycle.

When, finally, the case occurs in which the two successive rising edges of the two PWM voltages within a chopper cycle have a time interval tx from one another which is equal to or greater than the first delay time t1 (chopper cycles 1 and 4 in FIGS. 5 and 6), no (further) delay of the rising edge that occurs later is required, since the first delay time t1 is selected to be at least as large as the blocking or dead time of the charge pump.

This is implemented in that the countdown of the time counter 30 triggered by a first start signal has already elapsed when the second start signal arrives, so that the value zero results for the delay time signal td=t2=t1 −tx and as a result, the rising edge of the relevant later PWM voltage is not delayed by the relevant L-H delay unit 13, 23, but rather is switched through immediately to the input of the relevant multiplexer Mx1, Mx2 and thus also to the output Ad1, Ad2 thereof. This applies accordingly for the falling edge of said PWM voltage and the H-L delay unit 14, 24.

The circuit arrangement described can preferably be bridged, that is, the terminals A1 and Ad1 and A2 and Ad2 can be connected directly to one another when a user would like to connect additional buffer capacitors for the charge pump, for example, so that the charge pump can thus also switch on two or more MOSFET switches simultaneously.

The method and the circuit arrangement can also be used for switching the low-side MOSFETs of the bridge circuit or for switching other types of semiconductor switches used in the bridge circuit.

The method and the circuit arrangement can ultimately be used both for switching full bridges and half bridges.

The invention claimed is:

1. A method for controlling a stepper motor having a bridge circuit provided for a motor coil with semiconductor switches for applying a first and a second PWM voltages having opposite polarity to the motor coil and having a charge pump for switching at least high-side semiconductor switches of the bridge circuit, the charge pump having a blocking or dead time, having the following steps:
    detecting a time interval between a rising edge of one of the two PWM voltages and a subsequent rising edge of the other respective PWM voltage,
    delaying the rising edge that occurs later by a delay time that is at least as great as a difference between the blocking or dead time of the charge pump and the detected time interval, in which the blocking or dead time of the charge pump is a predetermined first delay time, and in which the rising edge that occurs later is delayed by a second delay time, which results from the difference between the first delay time and the detected time interval, and
    delaying a falling edge of the same PWM voltage that follows the rising edge that occurs later by the same delay time.

2. The method according to claim 1, in which the blocking or dead time comprises a period of time required to completely switch through a semiconductor switch and a period of time required to charge capacitors of the charge pump.

3. The method according to claim 1,
    in which low-side semiconductor switches of the bridge circuit are also switched using the charge pump.

4. A circuit arrangement for controlling a stepper motor in a voltage-controlled or voltage-regulated operating mode, having a bridge circuit provided for a motor coil (A) with semiconductor switches (HS1, HS2, LS1, LS2) for applying a first and a second PWM voltages (U(LA1), U(LA2)) having opposite polarity to the motor coil (A), and having a charge pump for switching at least high-side semiconductor switches (HS1, HS2) of the bridge circuit, the charge pump having a blocking or dead time which is required in order to be able to switch a further semiconductor switch after switching a first semiconductor switch, particularly for carrying out a method according to at least one of claims 1 and 2-3, having the following components:
    a first and a second L-H edge detectors (11, 21) for detecting a rising edge of the PWM pulses of the first and the second PWM voltages (U(LA1); U(LA2)), respectively,
    a first and a second H-L edge detector (12, 22) for detecting a falling edge of the PWM pulses of the first and the second PWM voltages (U(LA1); U(LA2)), respectively,
    a first and a second L-H delay unit (13, 23) for delaying a rising edge of the PWM pulses of the first and the second PWM voltages (U(LA1); U(LA2)),
    a first and a second H-L delay unit (14, 24) for delaying a falling edge of the PWM pulses of the first and the second PWM voltages (U(LA1); U(LA2)), respectively,
    a first multiplexer (Mx1) for switching through either the edges of the PWM pulses of the first PWM voltage (U(LA1)) delayed by the first L-H delay unit (13) and by the first H-L delay unit (14) or the undelayed first PWM voltage (U(LA1)) to the bridge circuit,
    a second multiplexer (Mx2) for switching through either the edges of the PWM pulses of the second PWM voltage (U(LA2)) delayed by the second L-H delay unit (23) and by the second H-L delay unit (24) or the undelayed second PWM voltage (U(LA2)) to the bridge circuit,
    a first and a second switching units (16, 26) for switching the first and second multiplexers (Mx1, Mx2), respectively, and
    a time counter (30) acted upon by the first and second L-H edge detectors (11, 21) for detecting a time interval (tx) between a rising edge of the first PWM voltage (U(LA1)) and a subsequent or simultaneous rising edge of the second PWM voltage (U(LA2) and to determine a delay time (t2), which corresponds to a difference between the blocking or dead time of the charge pump and the detected time interval (tx) and with which the following rising edge is to be delayed, for applying said delay time (t2) to the first or second L-H delay unit (13, 23), the first or second H-L delay unit (14, 24) and the first and second switching unit (16, 26).

5. The circuit arrangement according to claim 4,
    having a priority unit (31) for generating a first and a second selection signals (SelDy A1, SelDy A2) which is supplied to the first and the second switching units (16, 26), respectively, for switching the first and second multiplexers (Mx1, Mx2), respectively, to select the PWM voltages (U(LA1), U(LA2)) of which the rising and falling edges are to be delayed.

6. The circuit arrangement according to claim 4,
    in which inputs (A1, A2) of which are connected to the outputs of a voltage chopper (CH-U) and the outputs (Ad1, Ad2) of which are connected to the inputs of a driver circuit (Tr) for switching the semiconductor switches of the bridge circuit.

7. The circuit arrangement according to claim 4,
    in which the bridge circuit constitutes a full bridge having four semiconductor switches or a half bridge having two semiconductor switches.

8. The circuit arrangement according to claim 4,
    in which the semiconductor switches are MOSFETs.

* * * * *